Aug. 26, 1958     H. E. HALE     2,848,902
DRIVE SELECTOR MECHANISM
Filed March 27, 1956     3 Sheets-Sheet 1
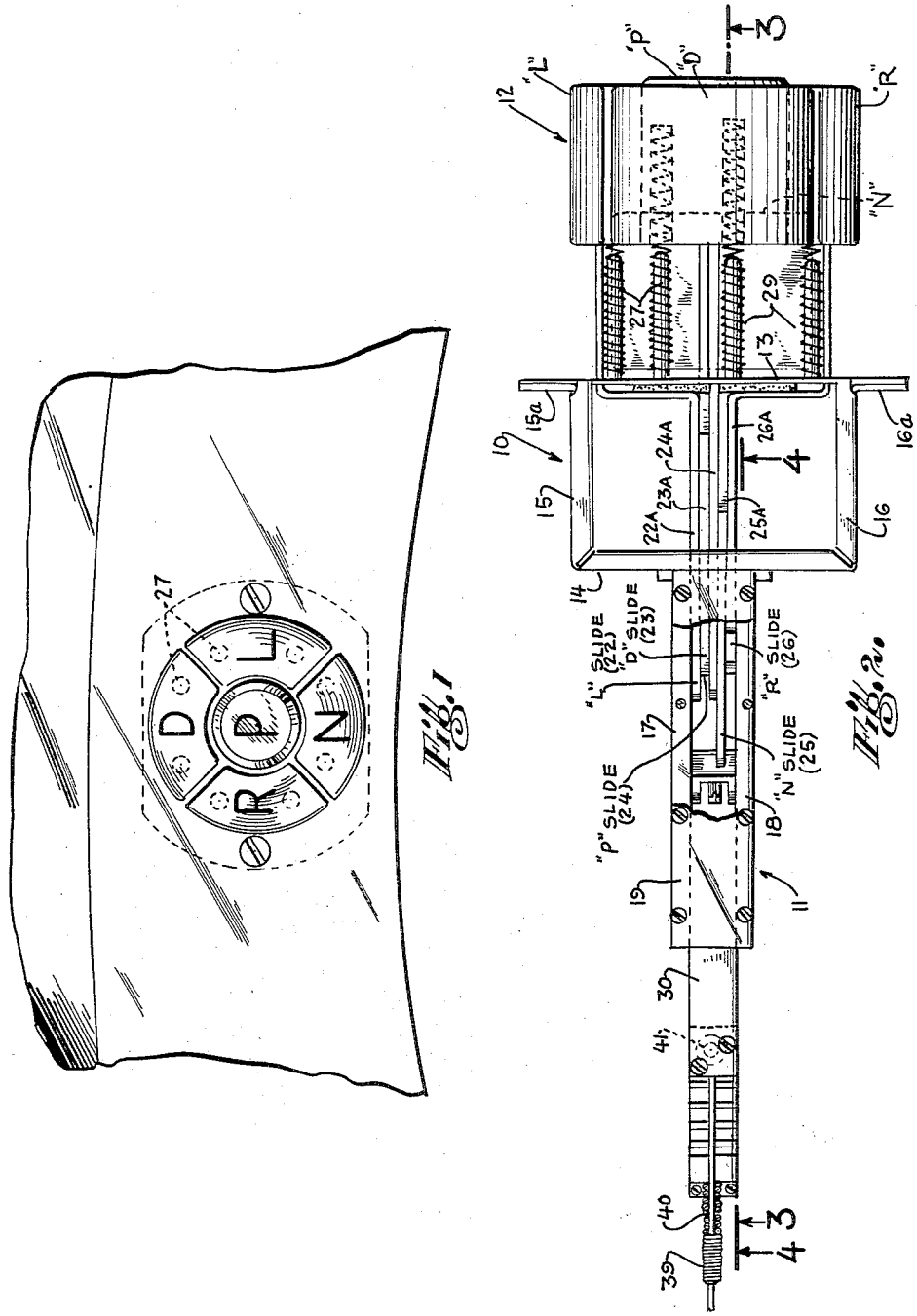
INVENTOR
HAYDEN E. HALE
BY
Kenyon & Kenyon
ATTORNEYS Aug. 26, 1958  H. E. HALE  2,848,902
DRIVE SELECTOR MECHANISM
Filed March 27, 1956  3 Sheets-Sheet 2
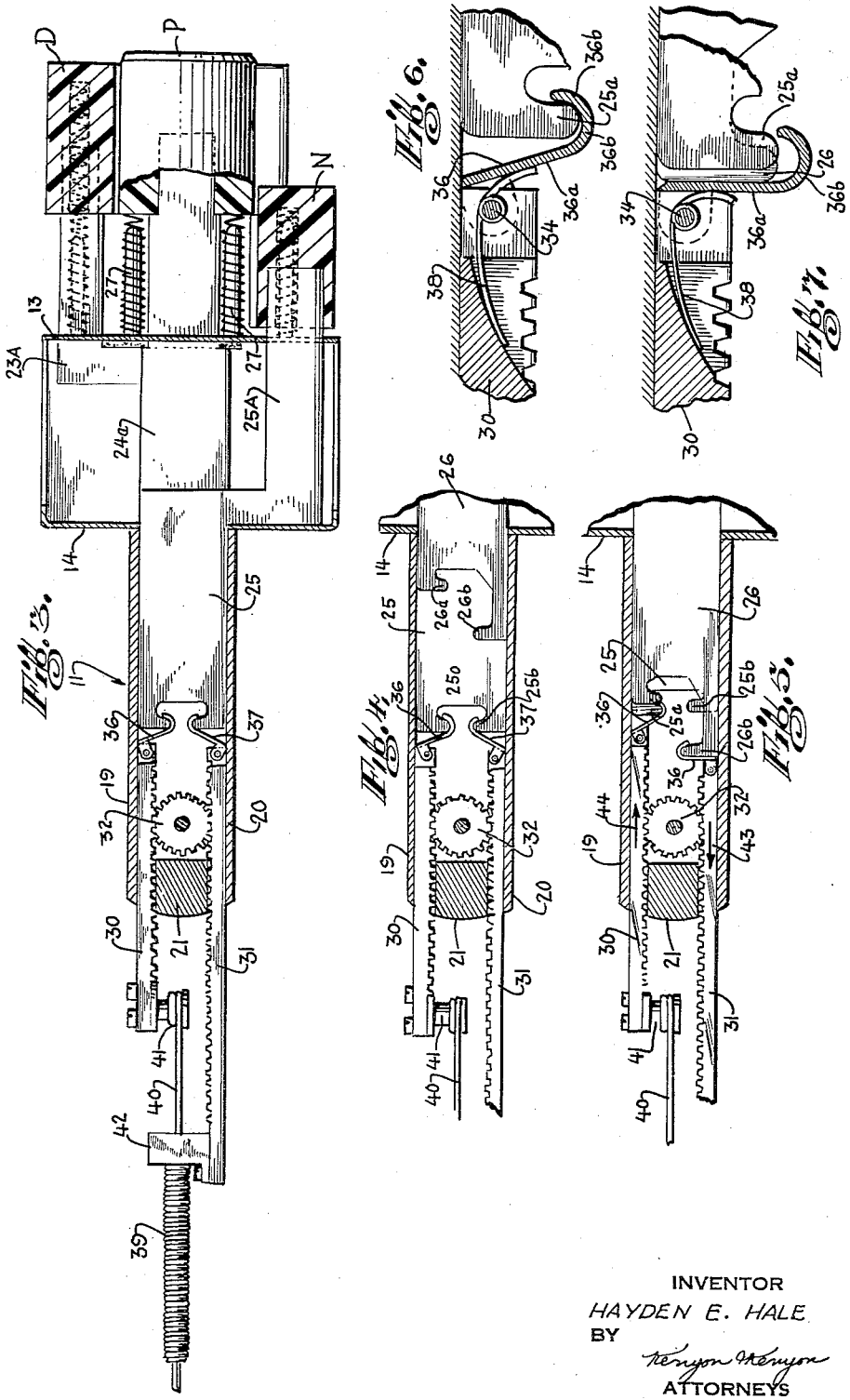
INVENTOR
HAYDEN E. HALE
BY
ATTORNEYS

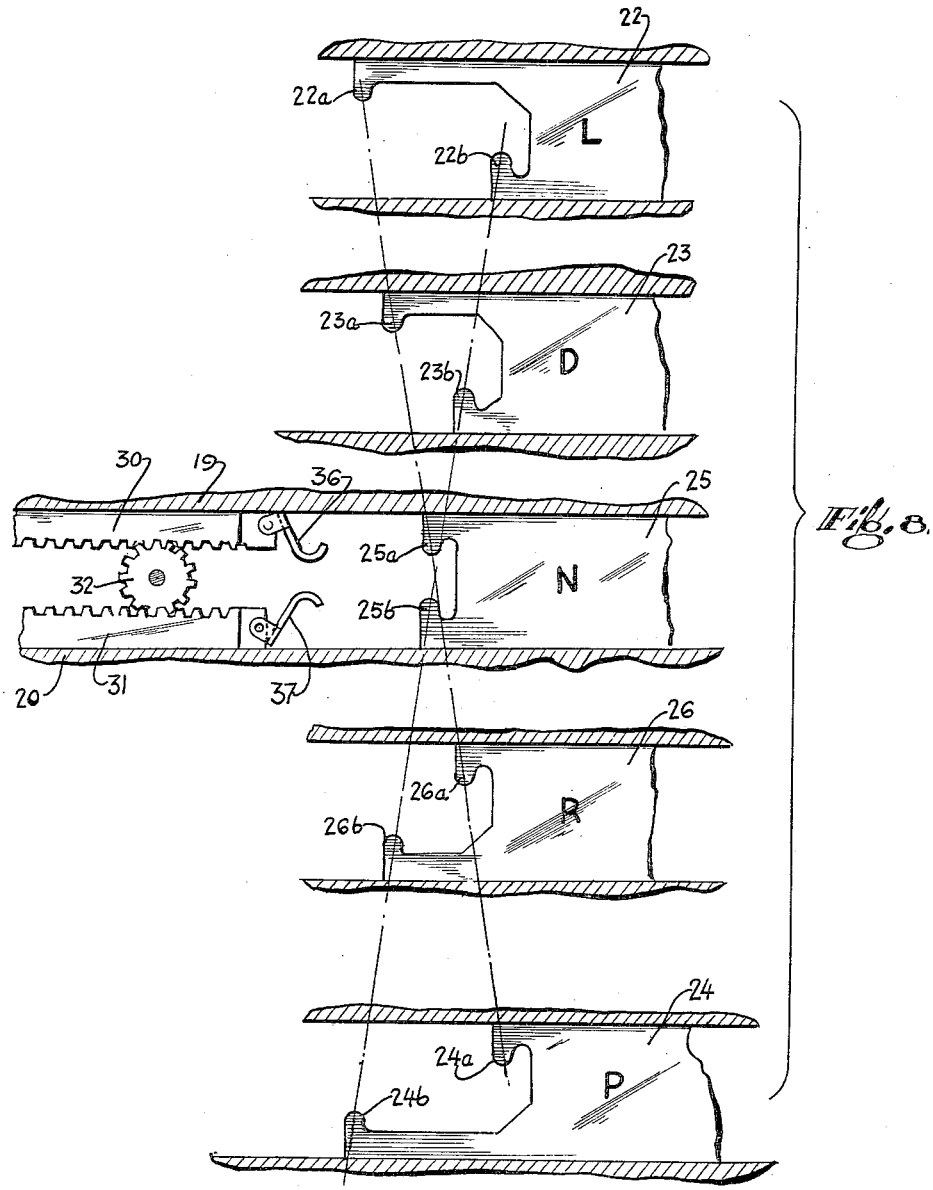

United States Patent Office 2,848,902
Patented Aug. 26, 1958

2,848,902

DRIVE SELECTOR MECHANISM

Hayden E. Hale, Kalamazoo, Mich., assignor to Shakespeare Products Company, Kalamazoo, Mich., a corporation of Michigan Application March 27, 1956, Serial No. 574,303

6 Claims. (Cl. 74—502)

The present invention relates generally to selective actuating mechanisms and more particularly to a push-button drive selector for controlling the power transmission system of an automobile and adapted to magnify a push-button movement so as to effect a relatively large displacement of a sliding wire operatively coupled to the selector.

In the conventional automotive transmission system, a manually-operated shift lever is employed which functions to shift the transmission gears from a neutral position to other operative positions providing forward and reverse speeds, as desired. In recent years automatic transmission or torque conversion systems have been developed in conjunction with push-button devices which act to select the desired driving range, thereby eliminating altogether the need for a manual shift lever. With such devices the operation of the vehicle is greatly simplified and the driver has merely to press an appropriate button in order to put the vehicle into low gear, reverse, neutral or in automatic drive operation. The push-button selector is coupled to the transmission system by means of a Bowden wire cable whose sliding wire is displaced to an extent depending on which button is actuated, the extent of displacement determining which gear is thrown into operation.

Experience has shown, however, that existing push-button selector assemblies possess certain drawbacks which give rise to serious hazards in car operation. These dangers stem from the fact that it is entirely possible for the transmission system to be engaged in a given range and yet for all of the push-buttons to be out. Consequently, the push-button panel affords no indication as to the status of the transmission system, and one starting the automobile on the assumption that the system is in neutral, may find himself without warning in reverse or moving forward. Obviously, such unpredictable operation may lead to major accidents.

With existing assemblies, when one button is fully depressed to carry out a desired operation, say reverse, the button is locked in place and the transmission system is engaged. If now a second button, say neutral, is only partially depressed, this partial action will release the previously depressed reverse button without re-engaging the transmission system. If the partially depressed neutral button, rather than being fully depressed to lock in place, is then inadvertently permitted to return to its "out" position, the transmission system will still be engaged in reverse and yet the reverse button is out as well as all the other buttons. Thus no indication is presented as to the status of the transmission system, and the driver, not realizing his failure to complete the shift over from reverse to neutral, may find himself suddenly moving in an unintended direction.

Another drawback of existing arrangement arises from the fact that the depression of a given push-button effects a small displacement of the sliding wire connected to the selector. Since the relative displacement of the wire in response to the operation of the button determines the action which is to be taken, it becomes difficult to discriminate between the various displacements of the sliding wire when the different positions assumed thereby are all in relatively close proximity to each other.

In view of the foregoing, it is the primary object of the present invention to overcome the above-described drawbacks of known selector devices and to provide a push-button assembly operating on the lock-out principle whereby one button is engaged at all times and no button can be engaged without the release of another button.

More specifically, it is an object of this invention to provide a push-button drive selector wherein the partial depression of a button does not effect release of a previously engaged button until such time as the second button is fully depressed and engaged. Thus with an assembly in accordance with the invention, the status of the associated transmission system is indicated at all times, thereby precluding the possibility of inadvertent operation.

Also an object of the invention is to provide a push-button selector operatively coupled to a Bowden cable wherein the depression of any button effects a large displacement of the sliding wire relative to the sheath of the cable which is substantially greater than the extent of button movement.

Still another object of the invention is to provide a selector mechanism of the above type including a push-button array in a circular arrangement whose dimensions may be varied without affecting the size of the associated mechanism.

A further object of the invention is to provide an efficient and reliable push-button selector mechanism which is mechanically simple in construction, capable of being easily assembled and readily manufactured by mass production techniques. The selector is further characterized by long life under severe operating conditions.

The selector in accordance with the invention is particularly adapted for use in conjunction with automatic transmission systems. However, its use is by no means limited to this application and the selector may be used wherever positive push-button control is desired.

For a better understanding of the invention as well as other objects and further features thereof, reference is had to the following detailed description to be read in conjunction with the accompanying drawing, wherein like components in the various views are identified by like reference numerals.

Fig. 1 is a front view of the selector mechanism in accordance with the invention;

Fig. 2 is a top plan view of the selector mechanism;

Fig. 3 is a longitudinal section of the mechanism taken through the plane of line 3—3 in Fig. 2;

Fig. 4 is a fragment of a longitudinal section of the mechanism showing the relationship of two of the slide plates and the operating racks associated therewith;

Fig. 5 is another fragmentary view showing the relationship of two of the slide plates and the operating racks;

Fig. 6 is an enlarged detail of the latching means operating in conjunction with the slide plates;

Fig. 7 is another enlarged detail of the latching means operating in conjunction with the slide plates;

Fig. 8 shows schematically the angular relationship of the pawl element of the several slide plates with respect to the latch means on the operating racks.

Referring now to the drawings, and more particularly to Figures 1 and 2, the selective actuating mechanism in accordance with the invention comprises an open-ended rectangular frame, generally designated by numeral 10, a relatively small box-like casing, generally designated by numeral 11, attached to and extending rearwardly from the frame, and a plurality of push-buttons generally designated by numeral 12, projecting forwardly from the frame.

Frame 10 consists of a front wall 13, a rear wall 14 parallel thereto and side walls 15 and 16 having arcuate flanges 15a and 16a secured to the front wall by screws or similar means. In mounting the mechanism, the front wall thereof may be secured to the back of a panel or dashboard, with the push-button projecting through a suitable opening therein, as shown in Fig. 1.

Casing 11 is centrally mounted on the rear wall 14 of the frame, the front end of the casing being open and in registration with a like opening in the rear wall. The casing is constituted by side walls 17 and 18 and top and bottom walls 19 and 20. The rear end of the casing is enclosed by a closure member 21.

Independently slidable within casing 11 are five actuator or slide plates 22, 23, 24, 25 and 26, the plates extending into the casing through the front end thereof and being parallel to the side walls thereof.

As best seen in Fig. 1, five independently movable push-buttons labeled P, D, R, N and L are provided in a circular design. Button P is cylindrical in shape and forms the central portion of the design, the remaining buttons constituting arcuate segments circumferentially arranged about the central button. In practice, when the mechanism is installed as a drive selector in an automobile, button P serves to actuate a parking gear, button L the low gear, button D the automatic drive, button R the reverse gear, and button N the neutral position. Thus the driver has merely to depress the appropriate push-button to effect the desired operation. It is to be understood, however, that the invention is by no means limited to use in conjunction with transmission systems and may be employed wherever push-button control is desired selectively to manipulate a sliding wire to an extent determined by which button is depressed.

As is best seen in Fig. 2, the slide plates 22 to 26 are provided with extensions 22A to 26A which pass through suitable openings in front wall 13 of the frame and are embedded in or otherwise connected to buttons L, D, P, N and R, respectively. The extensions are offset relative to the slide plates so that the portions thereof projecting beyond the front wall 13 are spread apart and in line with the buttons. The extent to which these extensions are offset from the associated side plates is determined by the dimensions of the circular design of the push-buttons, the greater the diameter of the design, the greater the degree of offset. It will be obvious, however, that the size of the push-button design in no way affects the dimensions of the associated mechanism.

Projecting forwardly from front wall 13 of the frame are a plurality of prongs 27, a pair of prongs being provided for each of the push-buttons. Surrounding the prongs and extending into cylindrical recesses 28 formed in the buttons and in axial alignment with the prongs are helical springs 29, the recesses having a depth substantially equal to the length of the prongs. Springs 29 act to maintain the associated buttons normally in their extended or inoperative position, as shown in Fig. 2, but when a button is depressed, such as button N in Fig. 3, the prongs enter the recesses against the action of springs 29.

As best seen in Figs. 3 to 5, slidably disposed within casing against the inner surfaces of the top and top walls 19 and 20 are racks 30 and 31, the racks extending rearwardly through openings in closure 21. The upper rack is short relative to the lower rack 31. Interposed between racks 30 and 31 and intermeshing with the teeth thereof is a pinion 32 rotatably mounted on a pin 33 adjacent closure 21, the ends of the pin being journalled in the side walls of the casing. Thus a shift of rack 30 in the forward direction effects a clockwise rotation of the pinion 32, thereby causing a shift of rack 31 in the rearward direction. Conversely, a movement of rack 30 in the rearward direction effects a counter-clockwise rotation of pinion 32, causing rack 31 to shift in the forward direction.

Pivotally connected to the front ends of racks 30 and 31, by means of pins 34 and 35, are J-shaped pawl members 36 and 37, respectively. Each J-shaped pawl member, as best seen in connection with pawl 36 in Figs. 6 and 7, is constituted by a straight leg portion 36a and a concave foot portion 36b. Pawl member 36 is upwardly biased by means of a torsion spring 38 which is wound about pin 34, one end of the spring bearing against the rack and the other end against the leg of pawl 36. Pawl member 37 is downwardly biased by similar spring means.

As best seen in Fig. 8, the slide plates 22 to 26 cooperate with the pawls 36 and 37 on the racks, each plate being cut out to form upper and lower ratchet elements 22a, 22b, 23a, 23b, 24a, 24b, 25a, 25b and 26a, 26b, respectively. The upper and lower ratchet elements are engageable with pawls 36 and 37 and are longitudinally displaced relative to each other to an extent determined by the rack movement desired to be effected thereby. The pawls in combination with the ratchet element form releasable latches.

The slide plate 25 has its ratchet elements 25a and 25b with a zero longitudinal displacement so that when pawls 36 and 37 are engaged thereby, the associated racks occupy the same longitudinal positions. Moving up in Fig. 8 from the neutral slide plate 25, we then find the D slide 23 whose upper ratchet element 23a is in advance of the lower ratchet element 23b relative to pawls 36 and 37. Thus when these ratchet elements engage the pawls, the racks are caused to assume a similar longitudinal displacement. Going up another step in Fig. 8 we find slide plate 22 whose upper ratchet element 22a is even further advanced relative to lower panel 22b, as compared to slide plate 23, so that when the pawls are engaged thereby, a still further displacement of the racks is effected.

Now going down Fig. 8 from the neutral position, we first find slide plate 26 with its lower ratchet element 26b in advance of upper ratchet element 26a, the exact reverse of the relationship in slide plate 23, and we then find slide plate 24 with its lower ratchet element 24a still further advanced relative to upper ratchet element 24a, the exact reverse of slide plate 22.

Thus each slide plate when in engagement with the pawls brings about a different relative position of the racks. Connected to the racks is a Bowden cable which consists of a flexible tubular sheath 39, formed by a wire coil, and a wire 40 slidable therein. Wire 40 is attached by a connector 41 to the end of rack 30, whereas sheath 39 is attached by a connector 42 to the end of rack 31. Since movement of the top rack in one direction is accompanied by movement of the bottom rack to the same extent in the opposite direction, the resultant displacement of the sliding wire relative to the sheath is doubled, as compared to a conventional arrangement in which only the sliding wire is shifted and the sheath thereabout is stationary.

As shown in Fig. 4 in connection with slide plate 25, when ratchet elements 25a and 25b are in engagement with pawls 36 and 37, the ratchet elements are received and held within the concave foot portions of the pawls, thereby effecting engagement of the racks and the slide plate and causing the racks to assume relative positions determined by the relative longitudinal positions of the pawls. In the engaged position, the pawls are biased outwardly from the racks. When, however, a second slide plate is brought into operative position, such as plate 26 in Fig. 5, the advance ratchet element, in this case lower ratchet element 26b, engages the pawl 27 and presses it against the end wall of the racks 31, thereby releasing the previously held ratchet element, in this case ratchet element 25b. However, the slide plate 25 is not fully disengaged since the upper ratchet element 25a, as shown in Fig. 5, is still held by pawl 36. Finally when the upper ratchet element 26a enters the pawl 36 to press it against the rack 30, this lowers the foot portion of the pawl and the upper ratchet element 25a is released therefrom, thereby fully disengaging the slide plate 25 and permitting it to return to its inoperative position. Thus an engaged plate cannot be unlocked until a successively operated slide plate is fully engaged.

It will also be evident that when a given button is depressed to shift its associated slide plate toward the racks, the advance ratchet element of the plate, which may be the upper or lower ratchet element, is the first to engage the rack related thereto and this rack is shifted rearwardly by the continued movement of the slide plate. This is demonstrated in Fig. 5 by the action of lower ratchet element 26b on rack 31 as indicated by the direction of arrow 43. This rearward movement of rack 31 causes upper rack 30 to shift forwardly, as shown by arrow 44, to meet the upper ratchet element 26a. The relative displacement between the racks which determines the extent to which the sliding wire 40 is shifted relative to sheath 40 is of course determined by the relative displacement of the ratchet elements on the actuated slide plate. In this manner the sliding wire movement is selectively controlled by the push-button.

The manner in which a ratchet element is engaged or disengaged from a pawl is shown separately in Figs. 6 and 7. When a ratchet element, such as 25a, is locked in the pawl, it is received within the concave foot portion 36b, as shown in Fig. 6, the pawl being inclined relative to the rack by the action of spring 38. When a second ratchet element, such as 26a in Fig. 7, is thrust into the pawl to press leg portion 36a against the wall of the rack, foot portion 36b is lowered to release the previously locked ratchet element 25a.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A selector mechanism for operating a Bowden cable provided with a sliding wire and a sheath comprising first and second members slidably disposed in parallel planes, means operatively coupling said members whereby a shift of one member in a given direction effects a shift of the other to the same extent in the opposite direction, a plurality of actuating elements supported for movement independently of each other toward said members, each element having first and second projections directed toward said first and second members respectively and releasably engageable therewith, said projections having a predetermined longitudinal displacement whereby when said members are engaged thereby they are caused to assume corresponding relative locations, and means connecting said sliding wire to one member and the sheath to the other whereby the relative positions thereof are determined by the relative locations of the members.

2. A selector mechanism for operating a Bowden cable provided with a sliding wire and a sheath comprising first and second members slidably disposed in parallel planes, means operatively coupling said members whereby a shift of one member in a given direction effects a shift of the other to the same extent in the opposite direction, a plurality of actuating elements supported for movement independently of each other toward said members, each element having first and second projections directed toward said first and second members respectively, releasable means to effect locking engagement between said element and said members, said projections on each element having a predetermined longitudinal displacement whereby when said members are engaged thereby they are caused to assume corresponding relative locations, said releasable means being released only when a second element enters into engagement with said members whereby one of said elements is engaged at all times, and means connecting said sliding wire to one member and the sheath to the other whereby the relative positions thereof are determined by the relative locations of the members.

3. A selector mechanism for operating a Bowden cable having a sliding wire and a sheath comprising first and second members slidably disposed in parallel planes, means operatively coupling said members whereby a shift of one in a given direction effects a shift of the other to the same extent in the opposite direction, and a plurality of push-button operated actuating elements supported for movement independently of each other toward said members, each element having first and second projections directed toward said first and second members respectively and releasably engageable therewith, said projections on each element having a predetermined longitudinal displacement whereby when said members are engaged thereby they are caused to assume corresponding relative locations, said members each including latch means to releasably engage said projections, said latch means being releasable only when the projections of a second element enters into engagement with said racks, and means connecting said sliding wire to one member and the sheath to the other.

4. A selector mechanism comprising a rectangular casing, first and second racks slidable against the top and bottom walls of said casing and extending outwardly from the rear end thereof, a plurality of independently movable slide plates disposed in parallel relation to the side wall of said casing and extending outwardly from the front end thereof, a pinion rotatably supported between the side walls of said casing and intermeshing with said first and second racks whereby a shift of one rack in one direction effects a shift of the other rack to the same extent in the opposite direction, a rectangular frame having a front wall and a rear wall, said front end of said casing being secured to the rear wall of said frame, said rear wall having an opening through which said slide plates extend, a like plurality of independently movable push-buttons projecting from the front wall of said casing, said slide plates having extensions passing through said front wall and attached to respective push-buttons whereby said buttons when depressed cause said slide plates to shift in a straight line toward said racks, each plate being provided with first and second projections having ratchet element portions directed toward said first and second racks respectively and releasably engageable therewith, said ratchet elements having a predetermined longitudinal displacement whereby when said racks are engaged they are caused to assume corresponding relative locations.

5. A selector mechanism for actuating a Bowden cable having a wire slidable within a sheath comprising a rectangular casing, first and second racks slidable against the top and bottom walls of said casing and extending outwardly from the rear end thereof, a plurality of independently movable slide plates disposed in parallel relation to the side wall of said casing and extending outwardly from the front end thereof, a pinion rotatably supported between the side walls of said casing and intermeshing with said first and second racks whereby a shift of one rack in one direction effects a shift of the other rack to the same extent in the opposite direction, a rectangular frame having a front wall and a rear wall, said front end of said casing being secured to the rear wall of said frame, said rear wall having an opening through which said slide plates extend, a like plurality of independently movable push-buttons projecting from the front wall of said casing, said slide plates having extensions passing through said front wall and attached to respective push-buttons whereby said buttons when depressed cause said slide plates to shift in a straight line toward said racks, each plate being provided with first and second projections having ratchet element portions directed toward said first and second racks respectively and releasably engageable therewith, said ratchet elements having a predetermined longitudinal displacement whereby when said racks are engaged they are caused to assume corresponding relative locations, and means connecting said sliding wire and said sheath to said first and second racks respectively to effect an amplified movement thereof.

6. A selector mechanism, as set forth in claim 5, wherein said push-buttons are constituted by segments of a disc to provide a circular design, and said extensions are offset with respect to said slide plate to effect connection with said segments.

References Cited in the file of this patent

UNITED STATES PATENTS

| | | |
|---|---|---|
| 2,154,024 | Basnicki | Apr. 11, 1939 |
| 2,284,344 | Russell | May 26, 1942 |
| 2,388,581 | Soffietti | Nov. 6, 1945 |
| 2,533,477 | Laschenski | Dec. 12, 1950 |